(12) United States Patent
Daudet

(10) Patent No.: US 12,460,406 B2
(45) Date of Patent: Nov. 4, 2025

(54) CONCEALED HANGER

(71) Applicant: Simpson Strong-Tie Company Inc., Pleasanton, CA (US)

(72) Inventor: Larry Randall Daudet, Brentwood, CA (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 0 days.

(21) Appl. No.: 17/157,894

(22) Filed: Jan. 25, 2021

(65) Prior Publication Data

US 2021/0230858 A1    Jul. 29, 2021

Related U.S. Application Data

(60) Provisional application No. 62/965,724, filed on Jan. 24, 2020.

(51) Int. Cl.
*E04B 1/26* (2006.01)

(52) U.S. Cl.
CPC .... *E04B 1/2612* (2013.01); *E04B 2001/2628* (2013.01); *E04B 2001/2652* (2013.01)

(58) Field of Classification Search
CPC ........... E04B 1/2612; E04B 2001/2628; E04B 2001/2652
USPC .......................................................... 52/289
See application file for complete search history.

(56) References Cited

U.S. PATENT DOCUMENTS

| | | | |
|---|---|---|---|
| 924,912 A | | 6/1909 | Maydl |
| 1,533,724 A | * | 4/1925 | Clarke-James ....... E04B 1/2604 403/381 |
| 4,005,942 A | * | 2/1977 | Gilb ...................... E04B 1/2612 403/189 |
| 4,480,941 A | * | 11/1984 | Gilb ...................... E04B 1/2612 248/216.1 |
| 4,646,497 A | | 3/1987 | Hoenle |
| 5,042,217 A | * | 8/1991 | Bugbee ................... F16B 9/058 52/643 |
| 5,555,694 A | * | 9/1996 | Commins ............... F16B 9/052 248/300 |
| 5,779,380 A | | 7/1998 | Knapp |

(Continued)

FOREIGN PATENT DOCUMENTS

| | | |
|---|---|---|
| DE | 102 27 661 B3 | 1/2004 |
| DE | 103 26 196 B3 | 11/2004 |

(Continued)

OTHER PUBLICATIONS

European patent Office, Communication Pursuant to Rules 70(2) and 70a(2) EPC, 21744970.1-1005/4092925 PCT/US2021014964, Supplementary European Search Report, Annex to the European Search Report on European Patent Application No. EP 21 74 4970, Feb. 20, 2024, 12 pages, European Patent Office, Munich, Germany.

(Continued)

*Primary Examiner* — James J Buckle, Jr.
(74) *Attorney, Agent, or Firm* — Charles R. Cypher

(57) ABSTRACT

A connector joins a beam to a joist, the connector has two members with mating portions. The mating members are provided with shoulders that engage each other and transmit gravity loads between the members and engage angled fasteners to make the connection.

18 Claims, 5 Drawing Sheets

(56) References Cited

U.S. PATENT DOCUMENTS

| | | | |
|---|---|---|---|
| 6,174,119 B1* | 1/2001 | Orr | F16B 15/0053 |
| | | | 411/469 |
| 6,658,806 B1* | 12/2003 | Leek | E04B 1/41 |
| | | | 52/715 |
| 6,837,019 B2* | 1/2005 | Collie | E04B 7/045 |
| | | | 52/489.1 |
| 6,922,967 B2* | 8/2005 | Collie | E04B 7/063 |
| | | | 52/715 |
| 7,004,436 B2 | 2/2006 | Knapp | |
| 7,716,877 B2* | 5/2010 | Gilstrap | F16B 9/058 |
| | | | 403/DIG. 15 |
| 7,762,031 B2* | 7/2010 | Leek | E04B 1/2608 |
| | | | 52/712 |
| 7,909,530 B2 | 3/2011 | Okura | |
| 8,769,901 B2 | 7/2014 | Todd et al. | |
| 9,887,017 B2 | 2/2018 | Bresous et al. | |
| 10,590,644 B2 | 3/2020 | Naylor et al. | |
| 10,822,788 B2 | 11/2020 | Knapp | |
| 10,876,284 B2 | 12/2020 | Knapp | |
| 10,968,621 B2 | 4/2021 | Knapp | |
| 2007/0154258 A1 | 7/2007 | Knapp | |
| 2009/0013508 A1 | 1/2009 | Putlizt et al. | |
| 2009/0056268 A1 | 3/2009 | Greenlee et al. | |
| 2018/0066424 A1* | 3/2018 | Daudet | E04B 2/768 |
| 2019/0136512 A1* | 5/2019 | Naylor | E04B 2/721 |
| 2020/0165813 A1 | 5/2020 | Naylor et al. | |
| 2021/0340754 A1* | 11/2021 | Brekke | E04B 1/2604 |

FOREIGN PATENT DOCUMENTS

| | | | | |
|---|---|---|---|---|
| DE | 10 2010 018 593 A1 | 10/2011 | | |
| EP | 1 669 502 A2 | 6/2006 | | |
| EP | 2 093 334 | 1/2013 | | |
| EP | 1 856 417 B1 | 11/2013 | | |
| GB | 1450871 A * | 9/1976 | | E04B 1/2612 |
| GB | 2047320 A * | 11/1980 | | E04B 1/2612 |
| GB | 2495548 A * | 4/2013 | | E04B 1/6141 |
| WO | WO-2021211693 A1 * | 10/2021 | | |

OTHER PUBLICATIONS

International Bureau of WIPO, International Search Report in PCT/US2021014964, Apr. 6, 2021, 2 pages, ISA/US Commissioner of Patent, Washington, DC, US.

International Bureau of WIPO, International Preliminary Report on Patentability and Written Opinion of the International Searching Authoirty in PCT/US2021014964, Apr. 6, 2021, 2 pages, ISA/US Commissioner of Patent, Washington, DC, US.

Plates and Connectors for Timber—Buildings, Structures and Outdoor, Catalog, Feb. 2020, pp. 60-94 and front and back cover, Rotho Blaas SRL, Cortaccia, Italy.

UV-T—Concealed hook connector TIMBER-TIMBER, Catalog, Nov. 4, 2017, 10 pages, Rotho Blaas SRL, Cortaccia, Italy.

* cited by examiner

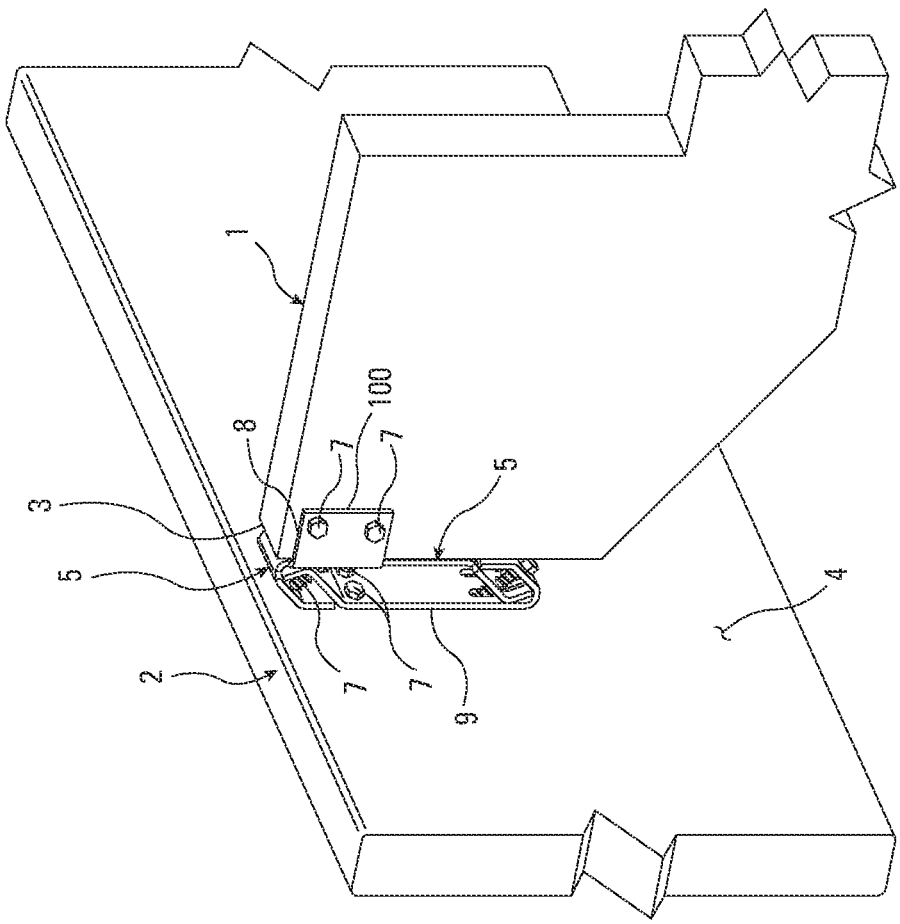
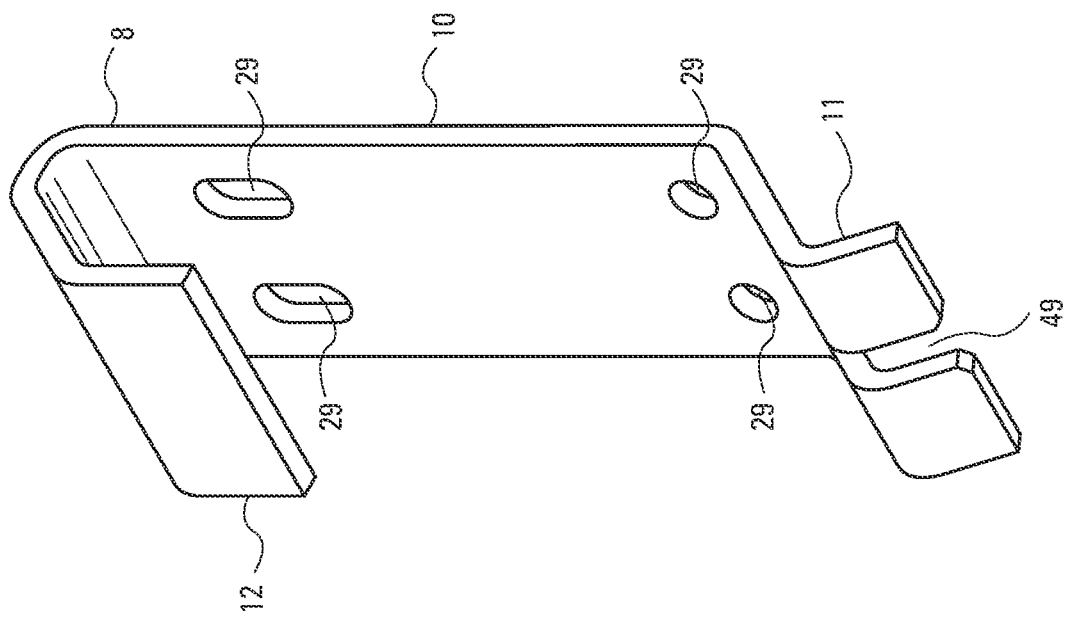

CONCEALED HANGER

BACKGROUND OF THE INVENTION

This invention relates to a concealed hanger for making a connection between a beam and a joist, or other structural members, such as stair stringer and a support member.

Generally, the beam and the joist are structural members that meet at a right angle although other angles are used in sloped roofs especially. Connectors for making this connection are often called hangers. There are many different connectors for attaching a beam to a joist. Some like the present invention are designed to be generally hidden from view. Others are exposed on the surfaces of the members and wrap underneath the joist and can attach to the front face or the top face of the beam.

There are many patented and un-patented concealed hangers. U.S. Pat. No. 2,793,407, invented by J. W. Johnston and granted in 1957, teaches a concealed connector made from sheet metal. The connector is made from a pair of flanged, mating dovetailed members. Johnston teaches providing the flanges of the female mating dovetailed member with openings or apertures that receive protuberances or knobs on the outer surface of the flanges of the male mating dovetailed member. In Johnston, the male member is made of a material that can flex slightly to allow the protuberances to slip past and then engage the apertures of the female member. According to Johnston this engagement firmly locks the male dovetailed member within the female dovetailed member.

US Patent Publication 207/0154257 A1, invented by Ove K. Guttormsen and published in 2007, teaches a concealed connector made from sheet metal. The connector is made from a pair of flanged, mating members having wedged or dovetailed sections that engage each other. Guttormsen teaches providing each member of the connector with a generally horizontally disposed ledge or shoulder that abuts a corresponding ledge or shoulder on the other member. According to Guttormsen this abutment of these shoulders prevents the male component from penetrating wedgingly so far into the female component as to deform and weaken the female component.

U.S. Pat. No. 7,004,436, invented by Friedrich Knapp and granted in 2006, teaches a concealed connector made from sheet metal. The connector is made from a pair of flanged, mating members having mating flanged portions that engage each other.

EP Patent Application 3 356 892 A1, invented by Friedrich Knapp and published in 2019, teaches a concealed connector made from sheet metal. The connector is made from a pair of mating members, each having shoulder portions that engage the end of the other member, and each has a pin that engages a flared notch in the other member.

The present invention provides a concealed hanger that is easy to install, economical to produce and creates a strong connection with little movement between the members.

SUMMARY OF THE INVENTION

It is an object of the present invention to provide a connection between a first structural member and a second structural member, generally a beam or header and a joist. It is a further object to provide a connection that resists tension and compression loading as well as gravity loads. It is a further object of the present invention to provide a connection that is easily adapted to present building practices and wherein the connector is generally hidden from view.

According to the present invention, the connector is a two-part member with each part made from relatively thin sheet steel. The connector has a longitudinal axis that extends along the connector from the top portion the bottom portion. The connector is designed to resist bending.

The present invention can be a connection between adjacent first and second structural members such as a beam and a joist. The connection is made with a two-piece connector and a first fastening and a second fastening. The first member is attached to a joist or stair stringer by one or more fasteners and the second member is attached to the beam by one or more fasteners. Each member is formed with a body that receives the fasteners. Preferably, each member of the connector has a hooked or curled end portion that matingly engages with a protruding or flanged portion of the other connector member. Preferably, each of the connector members is formed with a male flanged portion that extends from the body of the member and a female flanged portion that extends from the body of the connector member. Preferably, each of the members has a female hooked or curled end portion that receive the male flanged portion or portions of the other connector member.

According to the present invention, each of the members of the connector is attached to one of the structural members that make up the connection with one or more fasteners that enter the structural member at an angle to the longitudinal axis. This improves the connection of the member to the structural member as the fastener penetrates through many layers of the structural member if it is made from wood, and the fastener is at an inclined angle to pull-out forces. In some installations, two or more inclined fasteners are used to attach each connection member to a structural member. The multiple fasteners can be aligned with each other. Each connection member has one or more angled fasteners with which it is associated, and the other connection member can have portions that rest on or closely received these one or more angled fasteners to help with interlock between the connection members.

According to the present invention, the connector can be formed with variations in the hooked portion and the flanged portion of the connector.

According to the present invention, the members of the connector are formed with overlapping flanges disposed in interfacing relation along a columnar axis disposed generally orthogonally to the bodies of the members and orthogonally to the longitudinal axis. In certain instances this axis is generally aligned with some of the fasteners that connect the members to the first and second structural members. Preferably, one of the members is closely received by the other member along the columnar axis so that there is little movement between the members along the columnar axis.

BRIEF DESCRIPTION OF THE DRAWINGS

FIG. 6 is a perspective view of the connection according to the present invention, using the alternate connector, not all fasteners are shown.

FIG. 7 is perspective view of a member of the connector according to the present invention with a variation on the second embodiment.

DESCRIPTION OF THE PREFERRED EMBODIMENT

Figure 1:
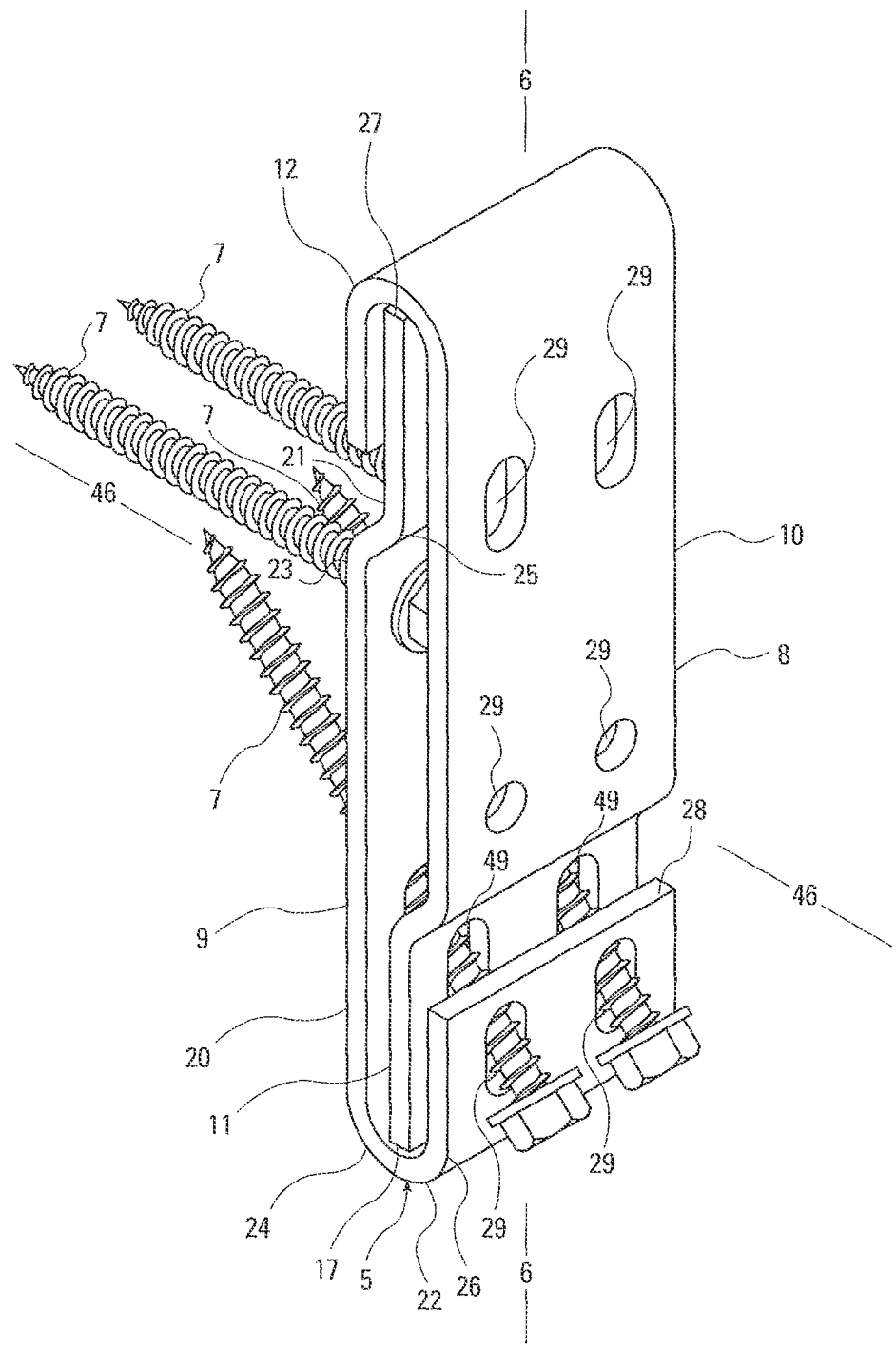
FIG. 1 is a perspective view of the connector according to the present invention.

The present invention is a connection between a first structural member 1 such as a joist or stair stinger and a second structural member 2 such as a beam or header or post. The connection is designed to resist gravity loads and tension and compression loads between the first structural member 1 and the second structural member 2. Preferably, the first structural member 1 has an attachment face 3, and the second structural member 2 has an attachment face 4. In one preferred embodiment of the invention, the attachment faces 3 and 4 are disposed generally parallel and adjacent to each other when the connection is formed. The first structural member 1 and the second structural member 2 are positively joined by the connector 5 of the present invention.

The first structural member 2 is typically made from wood, but it could also be any building material used to create the structural frame of a building or wall or other structure. For example the first structural member could be made from steel. The second structural member 2 is also typically made from wood, but it can be made from steel or it can also be a cementitious member or a brick wall.

In order to better define the invention the connector 5 is described as having a longitudinal axis 6. A first preferred embodiment of the connection of the present invention used to join the first structural member 1 and the second structural member 2 also includes one or more fasteners 7 received by the elongated connector 5 and the first and second structural members 1 and 2. The preferred fasteners 7 are preferably screws when the first structural members are wood.

The elements of the connection are preferably arranged in the following manner. The connection is formed with the attachment face 3 of the first structural member 1 and the attachment face 4 of the second structural member 2 disposed in close proximity to each other. The connector 4 has a first connector member 8 attached to the attachment face 3 of the first structural member 1 and a second connector member 9 attached to the attachment face 4 of the second structural member 2. The first and second connector members 8 and 9 of the connector are joined together. The end 3 of the first structural member 1 can be notched so that first member 8 sits within the notch and the end 3 of the joist 1 can interface with the attachment face 4 of the second structural member 2.

The first connector member 8 has a body 10 and one or more flanges 11 and 12 extending from the body 10. The first member 8 is joined to the second member 9 by operation of the first and second flanges 11 and 12. The flanges are connected to the body 10 at first bends 13 and 14. First bends 13 and 14 bend the first and second flanges 11 and 12 out of the general plane of the body 10 of the first member. The first and second flanges are also provided with second bends 15 and 16. Second bends 15 and 16 in first and second flanges 11 and 12 of the first member 8 bend the lateral edge portions 17 and 18 of the first and second flanges 11 and 12 so that they are preferably parallel or slightly angled to the generally planar body 10 of the first member 8. As shown in the drawings the first and second bends 13, 14, 15 and 16 in the first and second flanges 11 and 12 are generally, short-radius bends.

The second connector member 9 has a body 20 and one or more flanges 21 and 22 extending from the body 20. The second member 9 is joined to the first member 9 by operation of the first and second flanges 21 and 22 interacting with the first and second flanges 11 and 12 of the first member 8. The flanges 21 and 22 are connected to the body 20 at first bends 23 and 24. First bends 23 and 24 bend the first and second flanges 21 and 22 of the second member 9 out of the general plane of the body 20 of the second member. The first and second flanges 21 and 22 are also provided with second bends 25 and 26. Second bends 25 and 26 in first and second flanges 21 and 22 of the second member 9 bend the lateral edge portions 27 and 28 of the first and second flanges 21 and 22 so that they are preferably parallel or slightly angled to the generally planar body 20 of the second member 9. As shown in FIG. 1, the first and second bends 23, 24, 25 and 26 in the first and second flanges 21 and 22 are generally, short-radius bends.

The connection is made with a two-piece hanger or connector 5 and a first fastening and a second fastening. The first member 8 is attached to first structural member 1 by one or more fasteners 7, constituting the first fastening. The second member 9 is attached to the second structural member 2 by one or more fasteners 7, constituting the second fastening. Each member 8 or 9 is formed with a body 10 or 20 that receives the fasteners 7. The bodies 10 and 20 are preferably formed with fastener openings 29 to receive the fasteners 7.

Preferably, each member 8 and 9 of the connector 5 has a hooked-shaped, female flanged portion that matingly engages with the male flanged portion of the other member 8 or 9. As shown in the drawings the second member 9 is formed with protruding flanges 21 and 22 that extend from the body 20 of the member 9. These protruding flanges 21 and 22 are used to guide the first member 8. As shown in the drawings, the protruding flange 21 of the second member 9 is received by the hooked portion of the second lateral flange 12 of the first member 8. The first and second flanges 11 and 12 and 21 and 22 of the first and second member 8 and 9 are formed with openings 29. Some of these openings 29 receive fasteners 7 that can be driven at an angle to the columnar axis 46 and the longitudinal axis 6.

According to the present invention, each of the members 8 and 9 of the connector 5 is made with portions along the longitudinal axis 6 that have shoulders or ledges 17 and 27 disposed generally transverse to the longitudinal axis 6 that will abut with or lie closely adjacent to portions on the other member of the connector 5.

Figure 3:
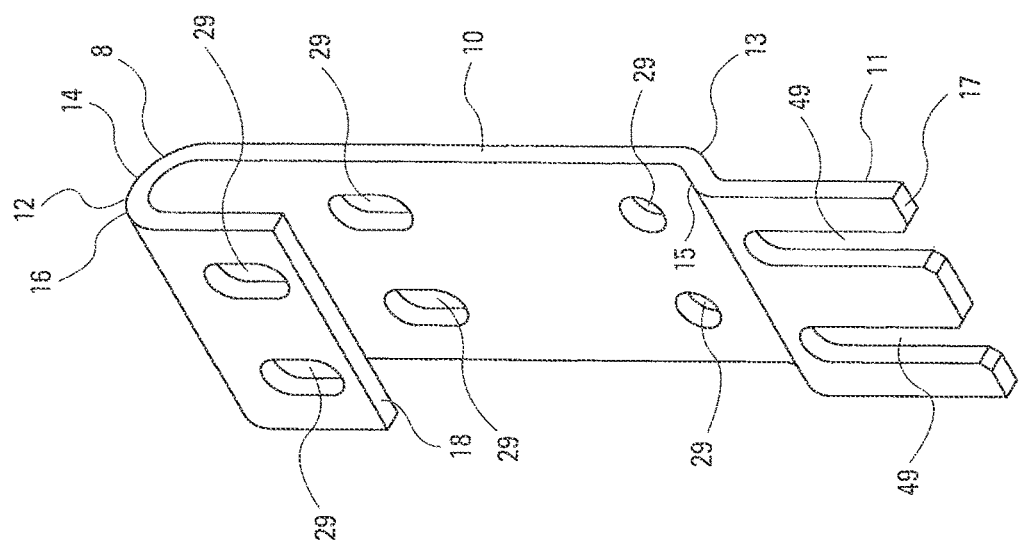
FIG. 3 is a perspective view of one of the members of the connector of FIG. 1.
Figure 5:
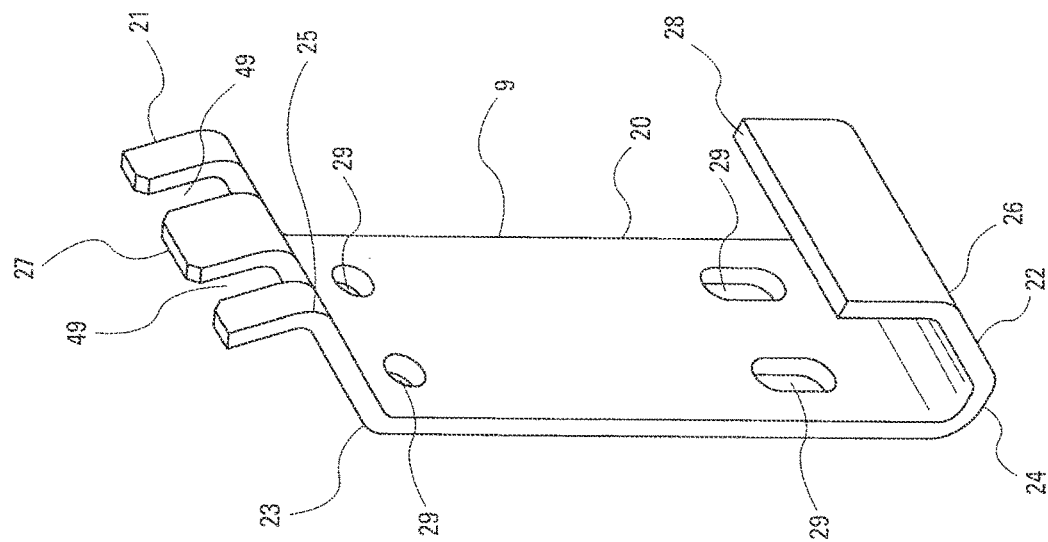
FIG. 5 is perspective view of one of the members of the alternate connector of the present invention.

As shown in the FIGS. 3 and 5, according to the present invention, the connector 5 is preferably formed with slotted openings 29 for some of the fasteners 7 to accommodate the angle of the fasteners 7 with respect to the connector members 8 and 9.

According to the present invention, the members 8 and 9 of the connector 4 are formed with overlapping portions disposed in interfacing or closely adjacent relation along a columnar axis 46 disposed generally orthogonally to the bodies 10 and 20 of the members 8 and 9. In certain instances this columnar axis 46 is generally aligned with some of the fasteners 7 that connect the members 8 and 9 to the first and second structural members 1 and 2.

Figure 2:
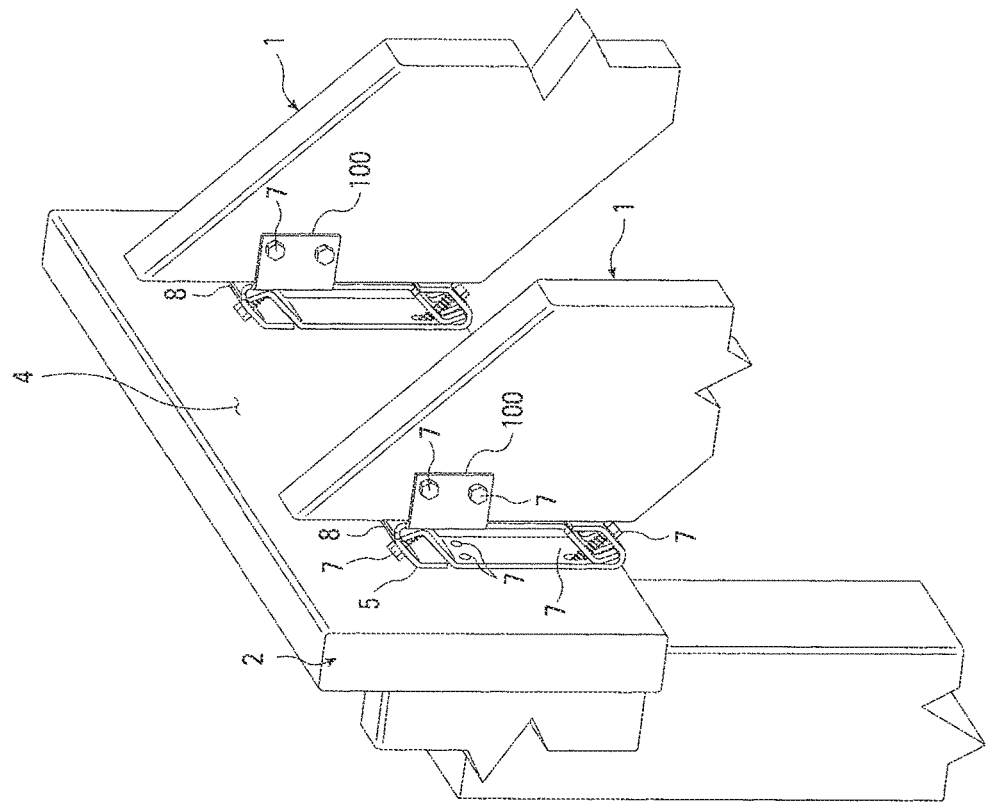
FIG. 2 is a perspective view of a pair of connections made according to the present invention.

FIG. 1 is a perspective view of the connector 5 according to the present invention. Each member 8 and 9 of the connector has elongated openings 29 that can receive fasteners 7 disposed at an inclined angle to each of the members 8 and 9 of the connector. As shown in FIG. 1, angled fasteners 7 are a pair of fasteners that pass through elongated openings 29 in the outer portion of hooked flange 22 and then pass through elongated slots 49 in the projecting flange 11 of member 8 and then pass through elongated openings 29 in the body 20 of member 9 before entering the second structural member 2. These angled fasteners 7 would enter the generally planar attachment face 4 of the second structural member 2 at a non-orthogonal angle to the planar attachment face 4. Also shown in FIG. 1 are fasteners 7 that are orthogonal to the planar body 20 of member 9 that pass through member 9 with the heads of the fastener engaging body 20 and then would enter the second structural member 2 (which is not shown). The orthogonal fasteners 7 shown in FIG. 1 could be formed with heads with sloped undersides that could engage openings in body 20 that are similarly sloped so the head of the fastener 7 can sit flush with the upper surface of planar body 20. The embodiment shown in FIG. 4 has the hooked flanges made with a spacing portion between bends 24 and 26 and bends 14 and 16 so that body members 10 and 20 of members 8 and 9 do not sit so close to each other so that fasteners 7 with heads that would project above the surfaces of body members 10 and 20 can be accommodated as shown in FIG. 2. As shown in FIG. 1, the extending flange 11 of member 8 surrounds much of angled fasteners 7 and can engage the angled fasteners 7 under gravity loads to help hold members 8 and 9 together. Angled fasteners 7 passing through the hooked portion 22 of member 9 can even support some of the weight of projecting portion 11 of member 8.

FIG. 2 is a perspective view of a connection made according to the present invention. The first, supported structural member 1 is inclined to extend downwardly from the second, supporting structural member 2 as with a stair stringer for building steps in a building. Connection tabs 100 attached to the body 10 of member 8 extend orthogonally from a side edge of body 10 and are flush with the side faces of structural member 1 and fasteners 7 are used to attach connection tabs 100 to the first structural member.

FIG. 3 is a perspective view of one of the members 8 and 9 of the connector 5 of FIG. 1. Both members 8 and 9 are similar. The elongated slots 49 in the projecting flange 11 of member 8 that receive the angled fasteners 7 are shown. The portions of the projecting flange 11 to either side of these elongated slots 49 that receive angled fasteners 7 can engage the angled fasteners 7 and prevent the members 8 and 9 from moving laterally with respect to each other. As shown in FIG. 7, in certain instances only one angled fastener 7 need be used, and then only one elongated notch or slot need be formed in the projecting flange to receive just one angled fastener 7. The angled fastener 7 that enters the first structural member 1 enters the member at a non-orthogonal angle to the generally planar attachment face 3 of structural member 1. As shown in FIG. 2, first structural member 1 may be very narrow, such that only one fastener 7 may be inserted into the end of the first support member, rather than two side-by-side fasteners 7. By forming member 8 with connection tabs 100, additional fasteners may be used to connect member 8 with the first structural support member 1 on side surfaces that have room to receive additional fasteners. As shown in FIG. 3, hooked portion 12 has two bends 14 and 16 of the same radius which turn the hooked portion 180 degrees, so that the end of the hooked portion 12 which is planar is parallel with the body 10. The hooked portion 22 of member 9 would be similar in shape. There is no spacing portion between bends 14 and 16 and bends 14 and 16 are of relatively small radius, so the end of hook portion 12 is disposed closely adjacent to body 10.

As shown in FIG. 5, the hooked portion 22 of an alternate embodiment of connector member 9 has a generally planar spacing portion between the bends 24 and 26 that is at a 45 degree angle to the planar body member 20. The hooked portion 12 of member 8 would be shaped similarly. The outer surfaces of these spacing portions which are generally planar are thus able to sit flush with the undersides of the heads of angled fasteners 7 that pass through hooked portions 22 and 12.

Figure 4:
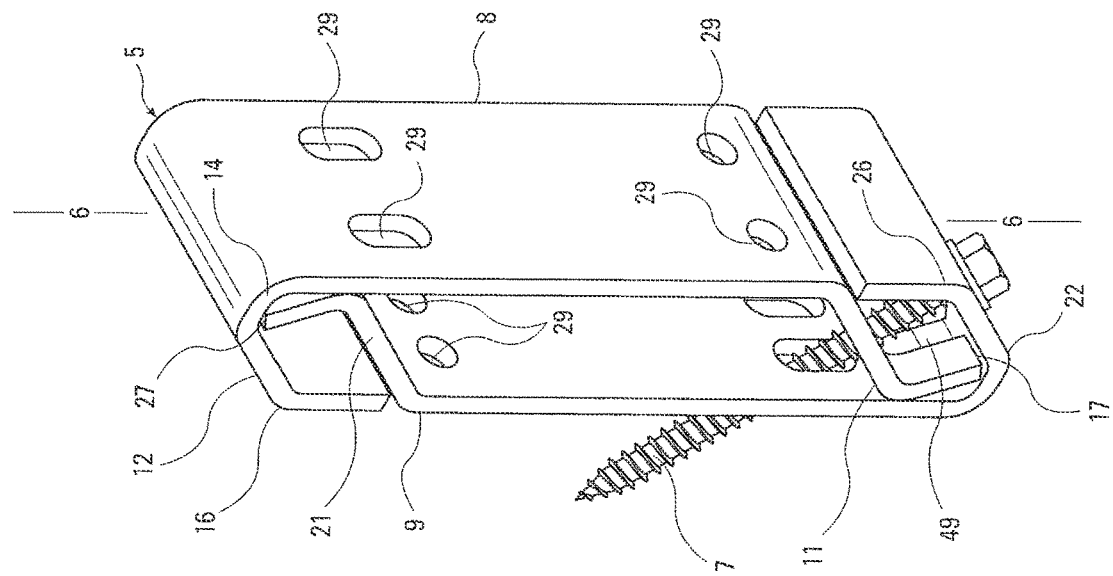
FIG. 4 is a perspective view of an alternate embodiment of the connector according to the present invention.

FIG. 4 is a perspective view of an alternate embodiment of the connector according to the present invention. In this embodiment, between bends 14 and 16 of member 8, and between bends 24 and 26 of member 9, spacing portions are provided so that the generally planar end portions of hooked portions 12 and 22 are spaced relatively far from the planar body members 10 and 20 of the members 8 and 9 respectively. This allows room for fasteners 7 with large heads. With respect to member 8, bend 14 bends hooked portion 12 through 135 degrees, and then bend 16 bends hooked portion 12 another 45 degrees.

FIG. 5 is perspective view of one of the members 8 or 9 of the alternate connector 5 of the present invention. In this embodiment, projecting portion 21 has a planar end portion that is not parallel with generally planar body portion 20. Bend 25 is larger than bend 23 so that the generally planar end portion of projecting portion 11 is angled and extends in a direction back towards the plane of generally planar body 10. This enables lateral edge portions 17 or 27 of protruding portions 11 and 21 to engage the hooked portions 12 and 22 near the spacing portions between the bends which makes for a stronger connection.

As shown in FIGS. 3 and 5, the elongated slots 49 in end portion 11 could have lateral edges at the entrance of their openings where they help funnel the fasteners 7 into the slots. That is these lateral edges of the slot splay outwardly as they reach the edge of the projecting flange 11.

FIG. 6 is a perspective view of the connection according to the present invention, using the alternate connector 5, not all fasteners 7 are shown.

FIG. 7 is perspective view of a member of the connector according to the present invention with a variation on the second embodiment. The projecting portion 11 is shown with only one fastener slot 49.

Figure 8:
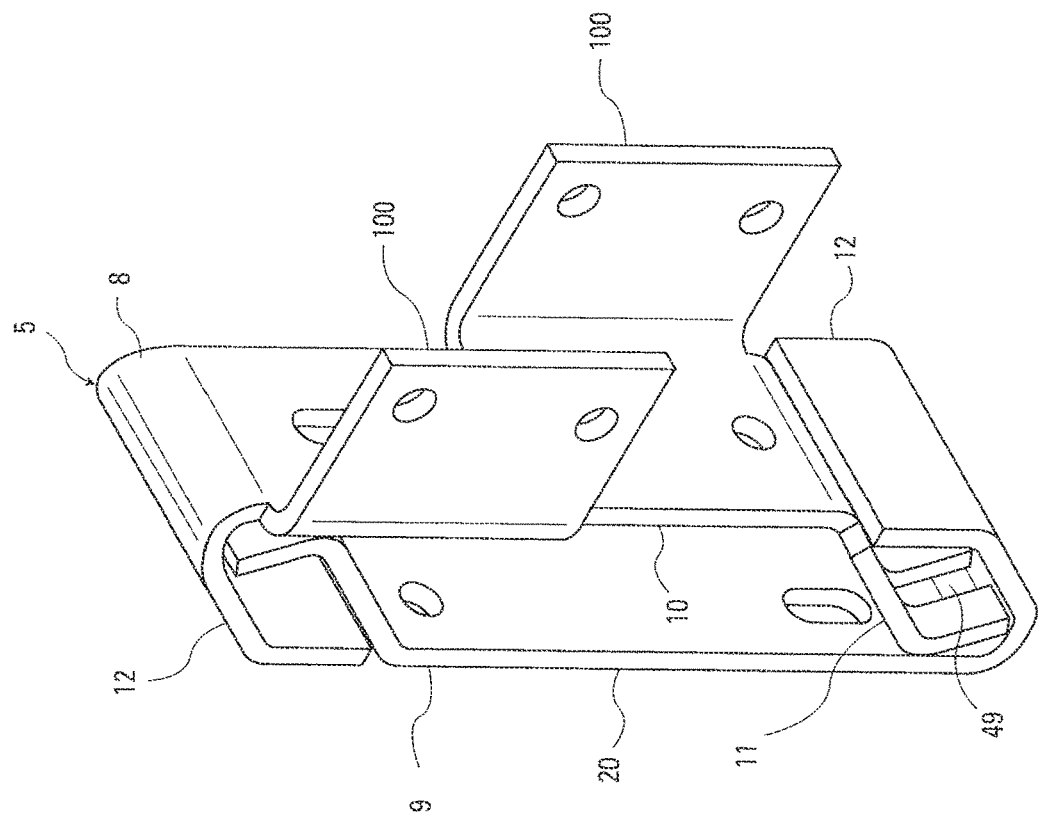
FIG. 8 is a perspective view of an alternate embodiment of the connector according to the present invention.

FIG. 8 is a perspective view of an alternate embodiment of the connector 5 according to the present invention. The body member 10 has one opening 29 for receiving one fastener orthogonal to the plane of body member 10 as when the member 8 is used with a very narrow first structural member 1.

Figure 9:
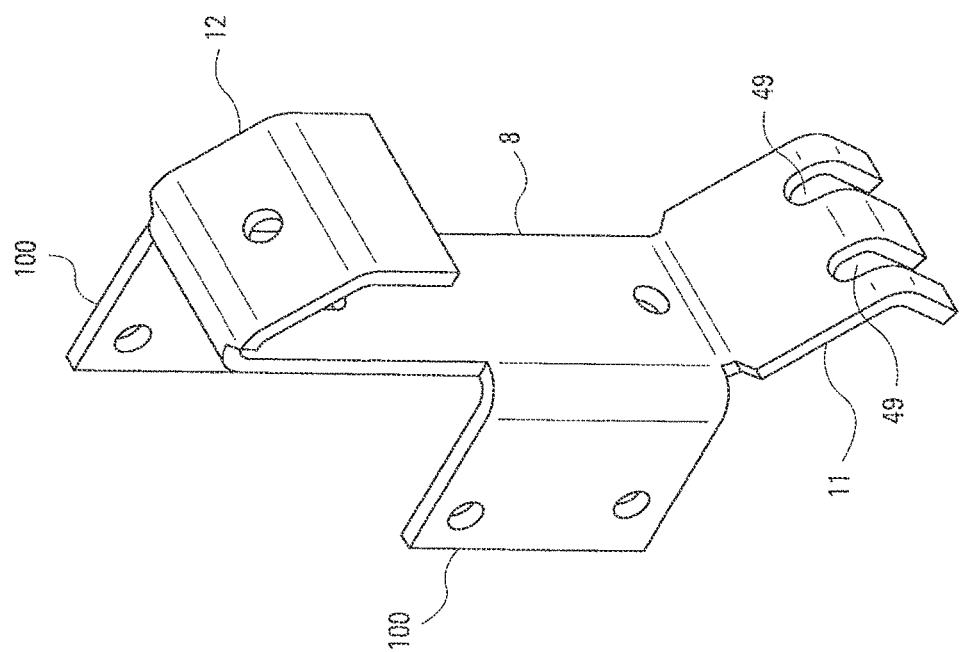
FIG. 9 is a perspective view of one of the members of the present invention.

FIG. 9 is a perspective view of one of the members of the present invention, showing connection tabs 100. Only one fastener opening 29 for one angled fastener is shown in the hooked portion 12.

The connection is made by attaching connector member 8 to structural member 1 with fasteners 7 and connecting connector member 9 to structural member 2 with fastener 7. Then the connectors 8 and 9 are brought together so that slots 49 in both connector members 8 and 9 receive the angled fasteners 7 attaching the other member 8 or 9. At the same time, the flanged portions 11 and 12 and 21 and 22 of the connector members 8 and 9 over-lie each other and this enables lateral edge portions 17 or 27 of protruding portions 11 and 21 to engage the hooked portions 12 and 22.

I claim:

1. A connection between a first structural member and a second structural member made with a connector, the connection comprising:
   a. the first structural member;
   b. the second structural member,
   c. the connector, the connector having a first connector member attached to the first structural member by one or more angled fasteners that are received by the first connector member and the first structural member, and a second connector member attached to the second structural member by one or more angled fasteners that are received by the second connector member and the second structural member, the connector having a longitudinal axis that extends from a top of the connector to a bottom of the connector with the one or more angled fasteners received in the first structural member and the one or more angled fasteners received in the second structural member being disposed at non-orthogonal angles to the longitudinal axis; and
   d. the first connector member has one or more elongated slots that receive the one or more angled fasteners received by the second structural member, and the second connector member has one or more elongated slots that receive the one or more angled fasteners received by the first structural member.

2. The connection of claim 1, wherein:
   a. the first connector member is formed with a male flanged portion, and the male flanged portion defines the one or more elongated slots that receive the one or more angled fasteners received by the second structural member; and
   b. the second connector member is formed with a male flanged portion, and the male flanged portion defines the one or more elongated slots that receive the one or more angled fasteners received by the first structural member.

3. The connection of claim 1, wherein:
   a. the first connector member is formed with a female flanged portion, and the female flanged portion has one or more openings that receive the one or more angled fasteners received by the first structural member; and
   b. the second connector member is formed with a female flanged portion, and the female flanged portion has one or more openings that receive the one or more angled fasteners received by the second structural member.

4. The connection of claim 3, wherein:
   a. the first connector member is formed with a body, and the body has one or more openings that receive the one or more angled fasteners received by the first structural member; and
   b. the second connector member is formed with a body, and the body has one or more openings that receive the one or more angled fasteners received by the second structural member.

5. The connection of claim 3, wherein:
   a. the one or more angled fasteners received in the first structural member enter a generally planar attachment face of the first structural member at a non-orthogonal angle to the generally planar attachment face; and
   b. the one or more angled fasteners received in the second structural member enter a generally planar attachment face of the second structural member at a non-orthogonal angle to the generally planar attachment face.

6. The connection of claim 5, wherein:
   a. the first connector member is formed with a male flanged portion, and the male flanged portion defines the one or more elongated slots that receive the one or more angled fasteners received by the second structural member; and
   b. the second connector member is formed with a male flanged portion, and the male flanged portion defines the one or more elongated slots that receive the one or more angled fasteners received by the first structural member.

7. The connection of claim 6, wherein:
   a. the male flanged portion of the first connector member that receives the one or more angled fasteners received in the second structural member is disposed between the body of the second connector member where the one or more angled fasteners received in the second structural member passes through the body, and between the female flanged portion of the second connector member where the one or more angled fasteners received by the second structural member pass through the female flanged portion of the second connector member; and
   b. the male flanged portion of the second connector member that receives the one or more angled fasteners received in the first structural member is disposed between the body of the first connector member where the one or more angled fasteners received in the first structural member passes through the body, and between the female flanged portion of the first connector member where the one or more angled fasteners received by the first structural member pass through the female flanged portion of the first connector member.

8. The connection of claim 7, wherein:
   a. the male flanged portion of the first connector member bears upon or is disposed closely adjacent to the female flanged portion of the second connector member; and
   b. the male flanged portion of the second connector member bears upon or is disposed closely adjacent to the female flanged portion of the first connector member.

9. The connection of claim 8, wherein:
   a. the body of the first connector member is a generally planar member, and the male flanged portion and the female flanged portion of the first connector member are bent out away from the generally planar member of the body; and
   b. the body of the second connector member is a generally planar member, and the male flanged portion and the female flanged portion of the second connector member are bent out away from the generally planar member of the body.

10. The connection of claim 9, wherein:
    the attachment face of the first structural member is disposed parallel to and closely adjacent to the attachment face of the second structural member.

11. The connection of claim 10, wherein:
    a. the first structural member is stair stringer, and
    b. the second structural member is a supporting member for the stair stringer.

12. The connection of claim 11, wherein:
    a. the first connector member is also attached to the first structural member with fasteners set orthogonally to the generally planar attachment face of the first structural member; and
    b. the second connector member is also attached to the second structural member with fasteners set orthogonally to the generally planar attachment face of the second structural member.

13. The connection of claim 1, wherein:
a. the female flanged portion of the first connector member is formed with a first bend where it is attached to the body of the first connector member, a generally planar spacing portion, and then a second bend;
b. the female flanged portion of the second connector member is formed with a first bend where it is attached to the body of the second connector member, a generally planar spacing portion, and then a second bend.

14. The connection of claim 13, wherein:
a. the generally planar spacing portion of the female flanged portion of the first connector member is set at a generally 45 degree angle to the generally planar body of the first connector member; and
b. the generally planar spacing portion of the female flanged portion of the second connector member is set at a generally 45 degree angle to the generally planar body of the second connector member.

15. The connection of claim 14, wherein:
a. the male flanged portion of the of first connector member bears upon or is closely adjacent to the generally planar spacing portion of the female flanged portion of the second connector member; and
b. the male flanged portion of the of second connector member bears upon or is closely adjacent to the generally planar spacing portion of the female flanged portion of the first connector member.

16. The connection of claim 15, wherein:
a. a lateral edge portion of the male flanged portion of the first connector member bears upon or lies closely adjacent to the generally planar spacing portion of the female flanged portion of the second connector member; and
b. a lateral edge portion of the male flanged portion of the second connector member bears upon or lies closely adjacent to the generally planar spacing portion of the female flanged portion of the first connector member.

17. The connection of claim 4, wherein:
a. the one or more openings that receive the one or more angled fasteners in the body of the first connector member are elongated openings; and
b. the one or more openings that receive the one or more angled fasteners in the body of the second connector member are elongated openings.

18. The connection of claim 1, wherein:
the first connector member is formed with one or more side flanges that overlie and are attached to side faces of the first structural member.

* * * * *